No. 886,450. PATENTED MAY 5, 1908.
J. H. WHEELOCK & W. B. PENCE.
SAW GAGE AND JOINTER.
APPLICATION FILED JUNE 6, 1906.
2 SHEETS—SHEET 1.
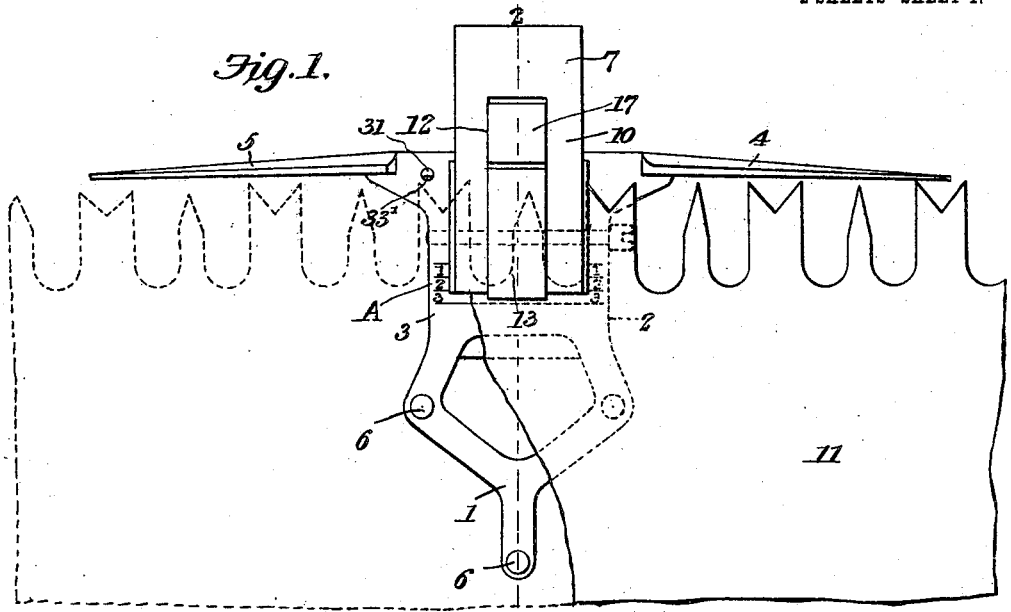
Fig. 1.
Fig. 2.
Fig. 6.
Fig. 7.
WITNESSES:
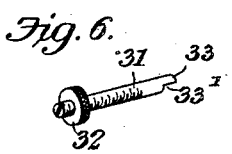
John H. Wheelock
Wiley B. Pence
INVENTORS
By 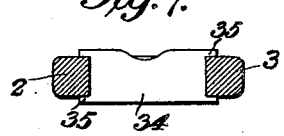
ATTORNEYS No. 886,450. PATENTED MAY 5, 1908.
J. H. WHEELOCK & W. B. PENCE.
SAW GAGE AND JOINTER.
APPLICATION FILED JUNE 6, 1906.

3 SHEETS—SHEET 2.

WITNESSES:

John H. Wheelock
Wiley B. Pence  INVENTORS

By C. A. Snow & Co.
ATTORNEYS

UNITED STATES PATENT OFFICE.

JOHN H. WHEELOCK AND WILEY B. PENCE, OF HAMILTON, WASHINGTON.

SAW GAGE AND JOINTER.

No. 886,450.  Specification of Letters Patent.  Patented May 5, 1908.

Application filed June 6, 1906. Serial No. 320,470.

*To all whom it may concern:*

Be it known that we, JOHN H. WHEELOCK and WILEY B. PENCE, citizens of the United States, residing at Hamilton, in the county of Skagit and State of Washington, have invented a new and useful Saw Gage and Jointer, of which the following is a specification.

This invention is an implement for setting, gaging and joining the teeth of saws, and has for its object to facilitate the handling of the implement so as to effectually perform the operations mentioned.

A further object of the invention is to embody the same in the nature of a portable hand-controlled implement, the parts of which are compactly arranged and disposed for conveniently changing from one operation to another without requiring any complicated resetting of the parts.

With these and other objects in view, the present invention consists in the combination and arrangement of parts as will be hereinafter more fully described, shown in the accompanying drawings and particularly pointed out in the appended claims, it being understood that changes in the form, proportion, size and minor details may be made, within the scope of the claims, without departing from the spirit or sacrificing any of the advantages of the invention.

Figure 4:
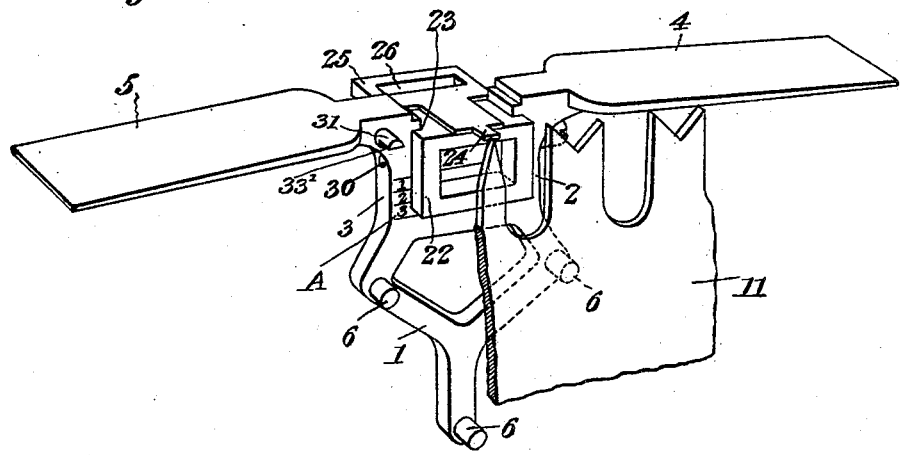
Figure 3:
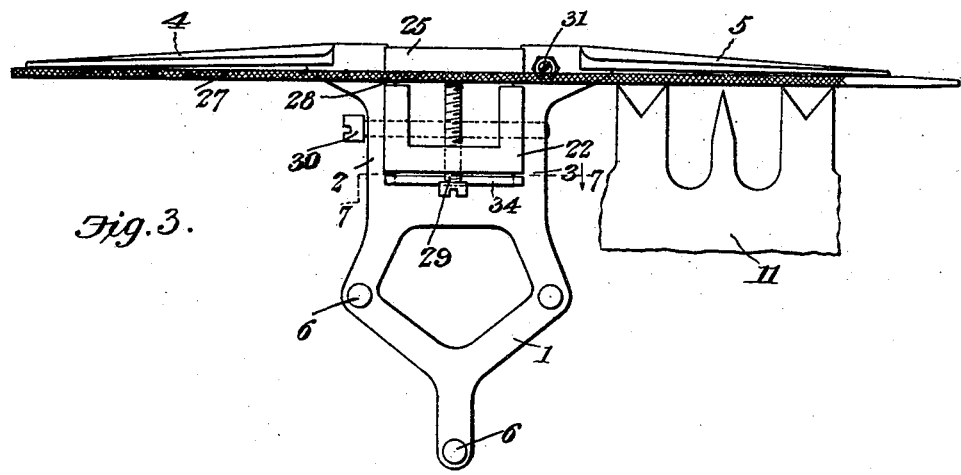
Figure 5:
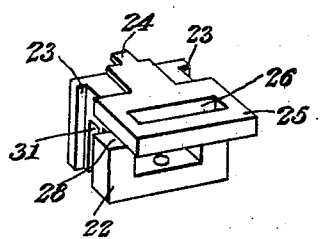

In the drawings:—Figure 1 is a front elevation of the device of the present invention applied to a saw blade for setting the teeth thereof. Fig. 2 is a sectional view on the line 2—2 of Fig. 1. Fig. 3 is a front elevation of the device arranged for jointing the teeth. Fig. 4 is a perspective view of the device arranged for gaging. Fig. 5 is a detail perspective view of the gage element removed. Fig. 6 is a detail perspective view of the set gage screw. Fig. 7 is a cross sectional view on the line 7—7 of Fig. 3.

Like characters of reference indicate corresponding parts in each of the several figures of the drawings.

The present invention includes a skeleton frame 1 of suitable size having a pair of posts 2 and 3 rising from the top thereof, and arms 4 and 5 extending outwardly in opposite directions from the top of the respective posts, these arms constituting rest elements to engage the points of the teeth as a guide for properly engaging the device with the saw. Each side of the frame is provided with a plurality of rest projections 6 of equal lengths to bear against the face of a saw blade and thereby maintain the frame in parallelism therewith.

For setting a tooth, a setting member is assembled with the frame, said member including a handle 7, as shown in Figs. 1 and 2 of the drawings, said handle being provided on each side of its forward end with a guideway 8 to receive the inner side of one of the posts 2 and 3. The front extremity of the handle is provided with a centrally-disposed flat boss 9 constituting an anvil with its inner extremity inclined or beveled rearwardly. An integral nose 10 is provided upon the forward end of the handle and overlaps the anvil 9 so as to form a space between these members for the reception of a saw blade such, for instance, as shown at 11, with a tooth of the saw lying against the anvil. The nose member 10 is provided with a bifurcation 12 in which is a hammer 13 of segmental form pivoted adjacent its lower end, as at 14. An arcuate slot 15 is formed through the hammer concentrically with the pivot support 14, and a pin 16 extends through the slot and is carried by the nose member to limit the swinging movement of the hammer. Upon the outer free corner of the hammer there is a projection or head 17, and in alinement therewith upon the inner free corner of the hammer there is a beveled face or shoulder 18 which is disposed in coöperative relation with the inclined portion of the anvil, so that, when the head 17 is struck by a suitable implement, the portion 18 of the hammer will strike the saw tooth and bend the same against the inclined portion of the anvil so as to give the tooth the desired set.

For the purpose of adjustably limiting the inward movement of the hammer, thereby to gage the set of the teeth, there is a wedge-shaped gage slide 19 carried by the back of the bifurcation 12 and provided with a longitudinal slot 20 receiving a threaded fastening 21 for use in holding the gage slide at any adjusted position.

For the purpose of gaging the set of the teeth, there is a gage pin 31 which is threaded and passes through a threaded opening in the post 3, the rear end of the pin being provided with a screw driver seat, as shown in Fig. 3 of the drawings, and also carrying a jam-nut 32 to engage the adjacent side of the post and hold the pin rigid when it has been adjusted to any desired position.

As best shown in Fig. 6 of the drawings, it will be seen that the forward end of the pin is provided with a flat face 33 adapted to contact with the points of the cutting teeth to test or gage the amount of set, said pin being also provided with a terminal recess 33' to permit the passage of the file when jointing said teeth. When the first tooth has been given the desired amount of set the gage-pin 31 is adjusted so that the flat face 33 will just escape the point of the tooth and then the nut 32 is tightened so as to hold the pin rigidly in place. After each tooth has been set it is tested with the gage-pin 31 and if any tooth hangs upon the pin it is evident that it has too much set and the reverse end of the set handle is placed against both the point and face of the tooth on one side thereof and the opposite side of the tooth subjected to a light blow from a hammer to reduce the set.

To gage the teeth of the saw, there is a gaging-member shown in Figs. 3, 4, and 5, said gage consisting of a rectangular block or body portion 22 provided in opposite sides with grooves or guide-ways 23 adapted to receive the posts 2 and 3 of the frame. A swaging gage element 24 projects transversely from the top of the member mid-way between the guides 23, and is designed to rest upon the points of the raker teeth after the same have been swaged as best shown in Fig. 4 of the drawing. If the projection strikes any of the teeth the latter are further swaged until the projection clears or slides freely over said teeth. The gaging-member is also provided with a raker gage 25 having an elongated slot 26 formed therein for the reception of the raver teeth so that the points of the teeth projecting above the face of the slot may be filed down level with said face and thus effect the jointing of the teeth.

When jointing the cutting teeth, an ordinary flat file 27, as shown in Fig. 3 of the drawing is received within the seat or groove 28 formed beneath the raker gage 25 and held in place by a clamping screw 29 which pierces the bottom of the member 22 and engages the under side of the file so as to clamp the latter against the under side of the raker-gage flange 25. With the file thus clamped upon the device and placed upon the points of the teeth with the rest-projections 6 engaging against the adjacent face of the saw, the device is moved back and forth so as to file the points of the teeth until they are all the same length. After the cutting teeth have been jointed, the file is removed and the raker teeth positioned within the slot 26 and said teeth jointed or filed down level with the upper surface of the gage 25. The device is then reversed so as to bring the swaging gage or projection 24 over the raker teeth after the latter have been swaged in any suitable manner and if the projection strikes any of the teeth the latter are to be further swaged until the projection clears the teeth as before described.

The length of the teeth is gaged by adjusting the gage block 22 with respect to the scale A— upon the front of the gage. In this connection it is proposed to provide a plurality of filler blocks, one of which has been shown at 34 in Fig. 7 of the drawing, said block being of a length to fit between the posts 2 and 3 and having spaced terminal projections or shoulders 35 to engage opposite sides of the posts and to hold the block in position.

A clamping screw 30 pierces the guide block of the guide posts 2 and 3 so as to rigidly clamp the member 22 upon the frame said member having a longitudinal bifurcation 31' in its bottom to accommodate the screw 30. If desired a spring may be interposed between the hammer 13 and the walls of the slot 12 for yieldably supporting the hammer 18 in spaced relation to the adjacent inclined face of said hammer.

From the foregoing description it is thought that the construction and operation of the device may be readily understood by those skilled in the art and further description thereof is deemed unnecessary.

Having thus described the invention, what is claimed is:—

1. An implement of the class described comprising a frame having spaced guide members and provided with laterally extending rest arms, a clamping screw connecting the guide members, and a tooth-engaging member removably fitted between the guide members and having a slot formed therein for the reception of the clamping screw.

2. An implement of the class described comprising a frame provided with a pair of spaced guide members, rest arms extending laterally from the opposite sides of the frame for engagement with a saw blade, a fastening device connecting the guide members, and a tooth-engaging member removably received between the guide members and having a slot formed therein for the reception of the fastening device.

In testimony that we claim the foregoing as our own, we have hereto affixed our signatures in the presence of two witnesses.

JOHN H. WHEELOCK.
WILEY B. PENCE.

Witnesses:
A. W. SCHAFER,
HENRY HURSHMAN.